US008667468B2

(12) United States Patent
Breeds et al.

(10) Patent No.: US 8,667,468 B2
(45) Date of Patent: Mar. 4, 2014

(54) SOFTWARE ACCESSIBILITY TESTING

(75) Inventors: Robert J. Breeds, Hursley (GB); James S. Taylor, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/160,301

(22) Filed: Jun. 14, 2011

(65) Prior Publication Data

US 2012/0324424 A1    Dec. 20, 2012

(51) Int. Cl.
 *G06F 9/44*    (2006.01)
(52) U.S. Cl.
 USPC ............................ 717/125; 717/105; 717/113
(58) Field of Classification Search
 USPC .................................................. 717/100–124
 See application file for complete search history.

(56) References Cited

U.S. PATENT DOCUMENTS

2003/0212890 A1* 11/2003 Dircks et al. .................. 713/164
2011/0307864 A1* 12/2011 Grechanik et al. ............ 717/124

* cited by examiner

*Primary Examiner* — Chuck Kendall
(74) *Attorney, Agent, or Firm* — Convergent Law Group LLP

(57) ABSTRACT

According to exemplary embodiments, method and systems for software accessibility testing are provided. Aspects of the exemplary embodiments include: obtaining accessibility information on content of a graphical user interface (GUI) of software under test, wherein accessibility information is content of the GUI for which describing text is available or content of the GUI which is accessible by keyboard use; determining content of the GUI which should not be available in a test due to a lack of accessibility information; restricting the GUI to restrict access to the content not available; and providing the restricted GUI to a user for testing.

18 Claims, 12 Drawing Sheets

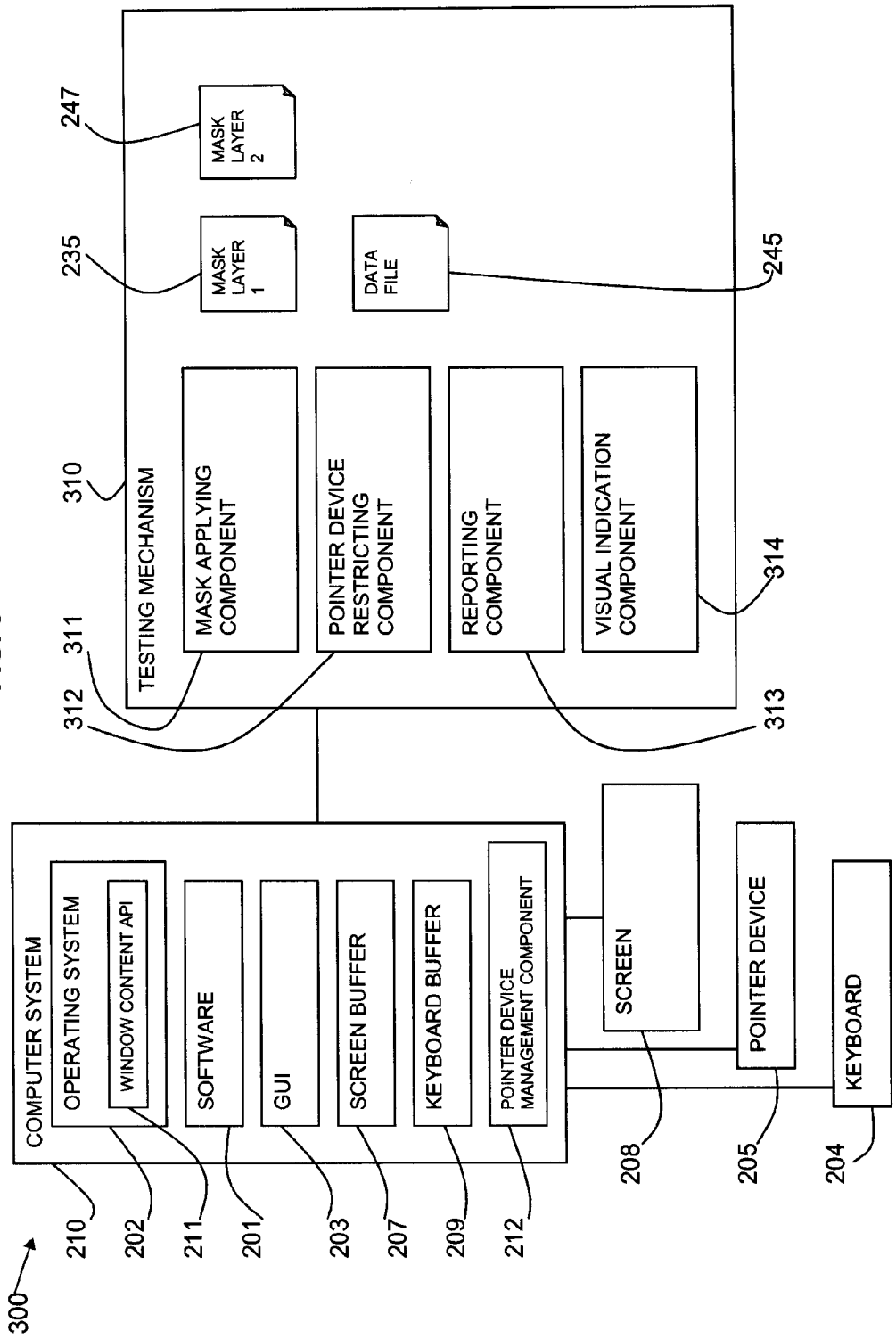

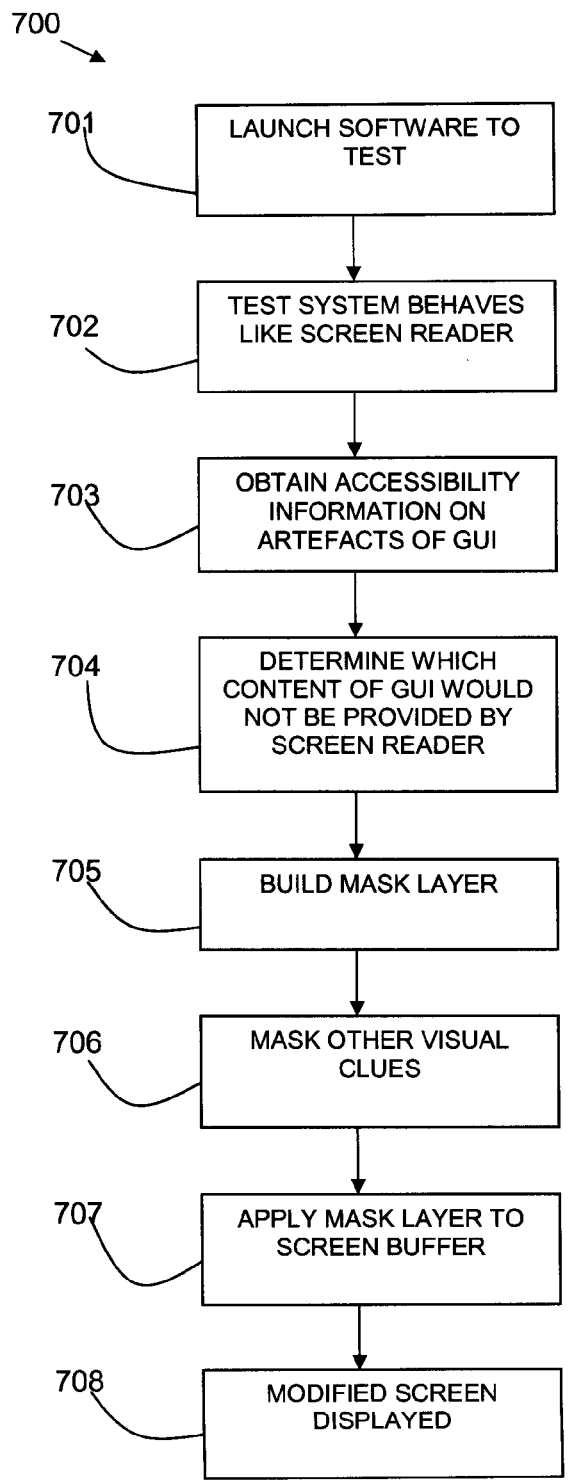

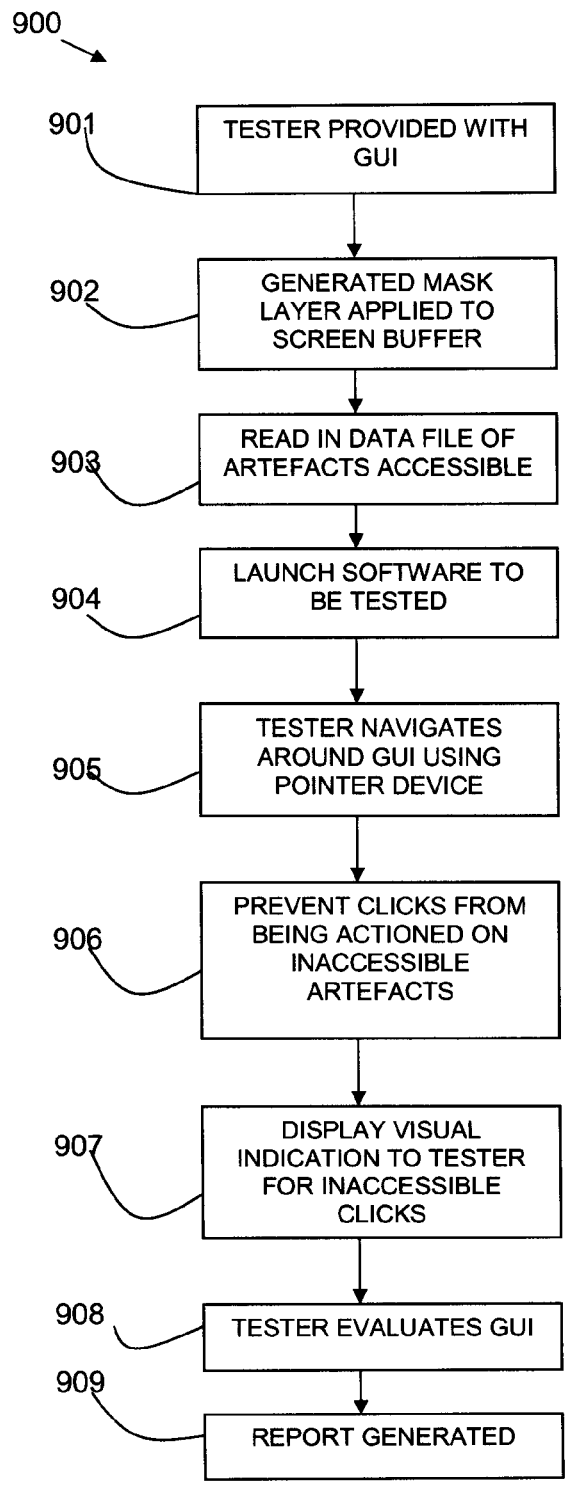

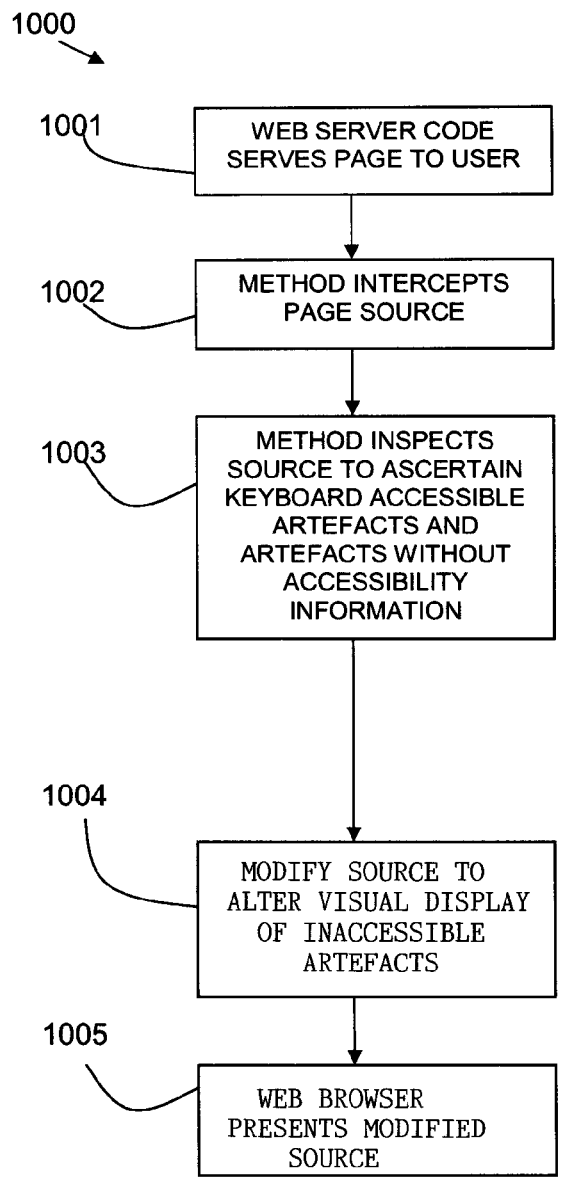

SOFTWARE ACCESSIBILITY TESTING

CROSS-REFERENCE TO RELATED APPLICATIONS

This application claims the benefit of foreign priority under 35 USC §119, to EP Patent Application No. 10166048.8, filed Jun. 15, 2010, which is incorporated herein by reference.

BACKGROUND

This invention relates to the field of software accessibility testing. In particular, the invention relates to software accessibility testing using visual output.

Accessibility refers to the practice of making products (such as software, web sites, etc.) usable by people of all abilities and disabilities.

A screen reader is a software application that attempts to identify and interpret what is being displayed on a screen and re-presents the output to a user using audio output, or a Braille output device. This is useful to users who are blind, visually impaired, illiterate, or have learning disabilities.

One of the difficulties in accessibility testing of a product is reluctance or lack of training on the part of (able) testers to do the testing in a way that truly reflects the target user and their disability. This is specifically true for users who are unable to see visual aspects of the user interface and rely solely on screen reader technologies for feedback. To do such testing fairly and thoroughly the tester should only be listening via screen reader technology and operating the user interface with a keyboard. Unfortunately, sighted testers inevitably fall back to using their sight to read the graphical user interface and the mouse to interact with the user interface, so the standard of testing can be diminished.

Although provision of audio feedback and keyboard navigation broadens the target user base for the software, it can be a daunting task for a sighted tester to operate the user interface in this way. A blind person tends to be an expert user of the keyboard as a navigation tool, and generally can process audio from screen readers at a faster rate than sighted users. However, blind users are a scarce resource within a software organization (and those that are blind may not want to focus on accessibility testing) and so the accessibility testers are often people non-representative of this user group.

The current approach to accessibility testing is insufficient and prone to inconsistency in quality, where sighted testers lapse to their familiar graphical user feedback and mouse input device. This approach entails the (sighted) tester operating the user interface using only a screen reader and keyboard and attempting to complete a number of scenarios. Such an approach tends to result in (sighted) testers still looking at the user interface for a good portion of their testing, which runs the risk of them interpreting a visual cue that is not available to the unsighted target user.

BRIEF SUMMARY

According to exemplary embodiments, method and systems for software accessibility testing are provided. Aspects of the exemplary embodiments include: obtaining accessibility information on content of a graphical user interface (GUI) of software under test, wherein accessibility information is content of the GUI for which describing text is available or content of the GUI which is accessible by keyboard use; determining content of the GUI which should not be available in a test due to a lack of accessibility information; restricting the GUI to restrict access to the content not available; and providing the restricted GUI to a user for testing.

BRIEF DESCRIPTION OF THE DRAWINGS

Embodiments of the present invention will now be described, by way of example only, and with reference to the following drawings:

FIG. 3 is a block diagram of an embodiment of a second aspect of a system in accordance with the present invention;

FIG. 7 is a flow diagram of an aspect of the described testing method for restricting accessible content, in accordance with an embodiment of the invention;

FIG. 9 is a flow diagram of an aspect of the described testing method for testing, in accordance with an embodiment of the invention; and FIG. 10 is a flow diagram of an aspect of the described testing method as implemented as a web service, in accordance with an embodiment of the invention.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An approach is proposed similar to double-machine-language-translation applied to a screen output. That is, when a phrase is entered into an automatic translation engine to translate the phrase, say from English to French, then the output is translated back to the original language, say French to English. The new, translated English phrase can then be assessed and compared to how it matches the original meaning. Thus the test is carried out in the familiar language.

In the context of the problem of accessibility testing, the first translation is effectively a translation from screen to audio-reader and then the reverse translation is from audio-reader to screen. The output screen is then tested by a sighted user for content.

When the testing is applied, what remains visible on the screen to the sighted tester is just the content that a screen reader would have read. All portions of the screen which would not have been read are highlighted, or blacked out, to indicate they are not present to all users.

The accessibility testing is further enhanced by applying the same pattern to keyboard navigation. The majority of screen reader users do not use a mouse or other pointer device for input into the computer. Screen readers user a wide variety of keyboard commands to carry out different tasks. However, the screen access provided by keyboard navigation is not as extensive as by a pointer device. Therefore, in the described system pointer device access is restricted to reflect the access available using only keyboard navigation.

Figure 1:
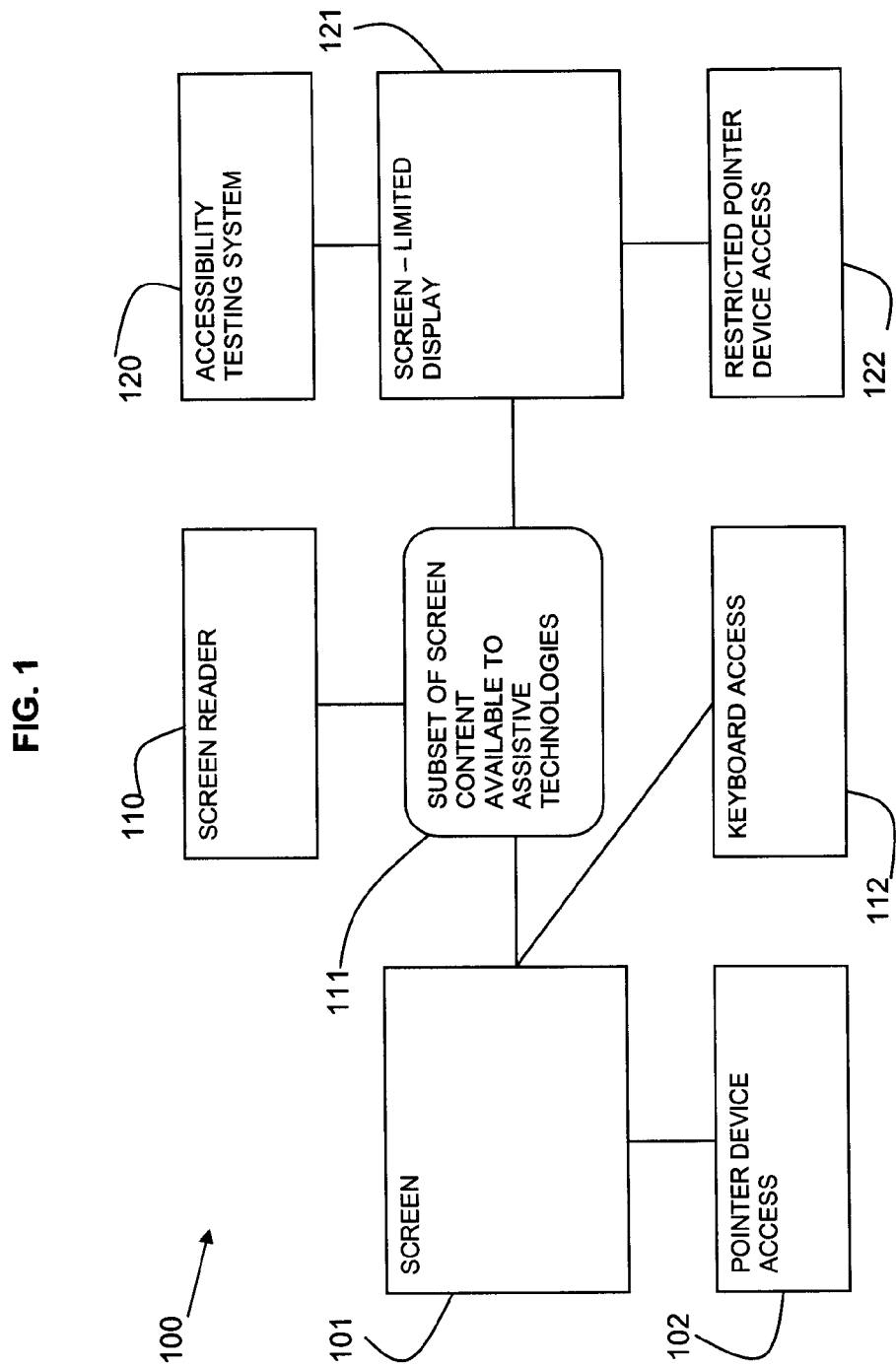
FIG. 1 is a schematic diagram of a system in accordance with the present invention.

Referring to FIG. 1, a schematic diagram 100 of the aim of the described accessibility testing system. A screen 101 is shown which may display a graphical user interface (GUI) of an application, web browser, operating system, or other visual output of a computer. Pointer device access 102 represents the accessibility of the screen 101. A pointer device may be a mouse, a touch pad, or other navigation device operating an on-screen pointer or cursor.

A screen reader 110 would translate the screen 101 to audio output using the information of a subset of the screen content 101 available to assistive technologies 111 and a user would have keyboard access 112 to the screen 101.

An accessibility testing system 120 provides a screen 121 with limited GUI display reflecting the content available to assistive technologies 111. The accessibility testing system 120 also provides restricted pointer device access 122 reflecting the keyboard access 112.

In this way, a sighted tester can carry out accessibility testing on the equivalent of the output of a screen reader 110 using the screen 121 with limited GUI display reflecting screen content available to assistive technologies 111 and with restricted pointer device access 122 reflecting the keyboard access 112.

This means that, as in the language translation metaphor, the sighted tester performs testing in their familiar comfort zone of screen viewing. What they see is a representation of what the unsighted user would hear. They are not able to fallback on using their sight (either intentionally or unintentionally) in the way they would have previously because the content that is not read out would simply be invisible or marked as such.

Thus there are several types of visual content that can be inspected for accessibility to screen readers. Illustrative examples of problematic content are:

A visual element (for example, an image) used to convey information, but lacking in a textual alternative for screen readers.

A visual element used to provide navigation/linking, but lacking in a textual alternative for screen readers.

Control or visual elements (with or without accessibility text), that is not reachable via keyboard navigation.

The described testing system works by interacting with a graphical user interface (GUI) in the same way that a screen reader technology does, to obtain information that would normally be used to produce the audio representation. However, instead of reading out this content it is used by the described test system to establish what is read out and what is not. Using this knowledge and access to the rest of the GUI components the system builds up a mask layer which covers those objects in the GUI which are not made available to the screen reader. When the described test system is enabled this mask is applied to the screen buffer. This creates a visual representation of what would be available audibly.

A screen reader is a program that uses a text to speech synthesizer to relay information about what is appearing on a GUI. Currently, most windows-based operating systems have screen readers use system hooks to gain access to keyboard input and menu and dialog box messages. It will call the operating system application programming interfaces (APIs) to determine some information about the current status. It monitors some API functions to catch changes to the cursor, focus, and other elements on the screen. Finally, it creates an off-screen model that contains information about each point on the screen (e.g. character, font, font size, class, etc.). The end user can then use a keystroke to access this information when he or she wants to find out about an element on the screen (e.g. the current title in the title bar). Some operating systems provide screen reader access to the display contents without maintaining an off-screen model by representing what is displayed and providing access to it via an API.

Figure 2:
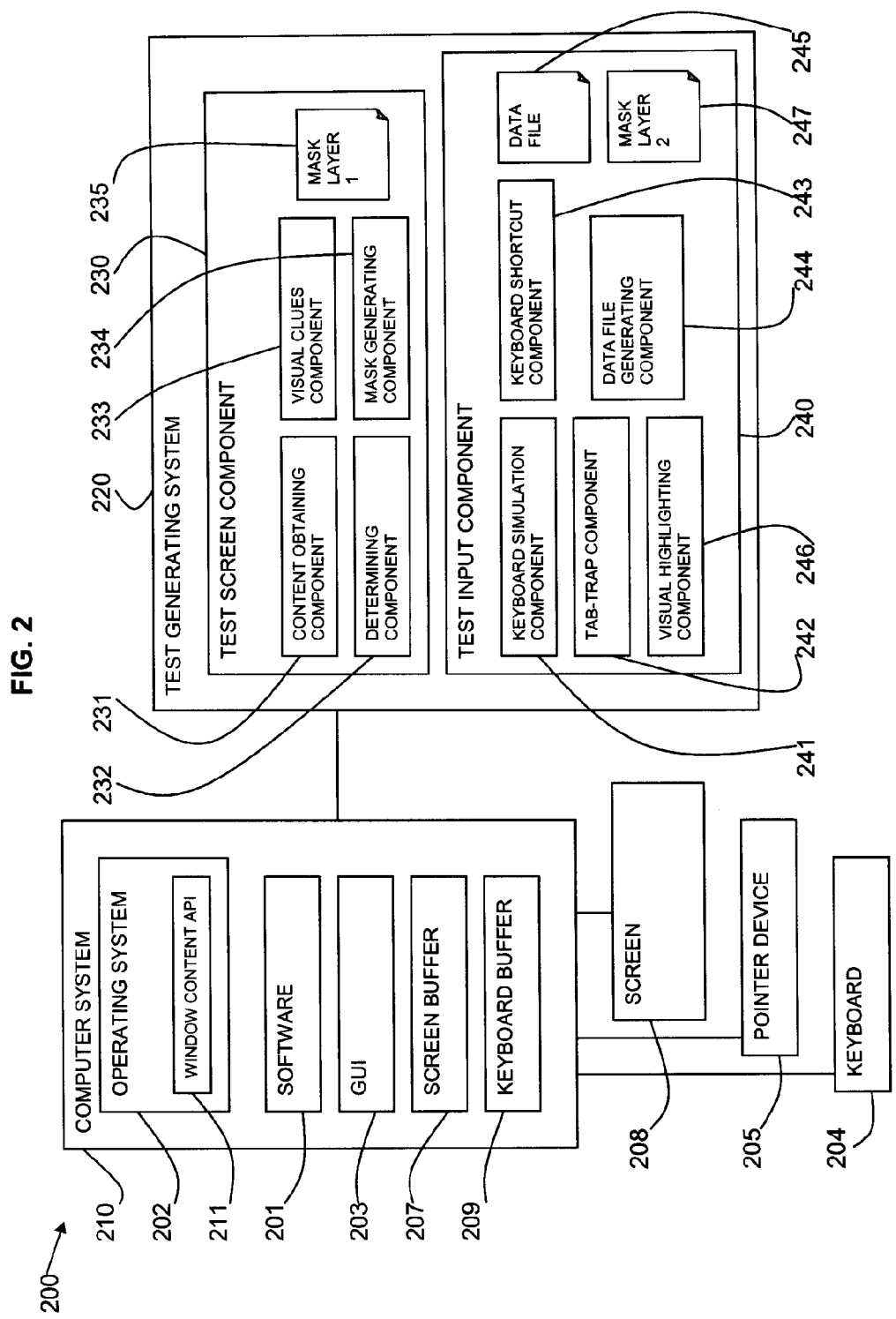
FIG. 2 is a block diagram of an embodiment of a first aspect of a system in accordance with the present invention.

Referring to FIG. 2, a block diagram shows an embodiment of a first aspect of the described system 200.

A computer system 210 is used to provide software 201 to be tested for an appropriate operating system 202 with a GUI 203 displayable on a screen 208. The computer system 210 includes a keyboard 204 and a pointer device 205 for input. The computer system 210 also includes a screen buffer 207 in the form of memory on a graphics card that the computer writes the intended screen display to, the graphics card then presents it to the screen 208. The computer system 210 also includes a keyboard buffer 209 in the form of memory between the keyboard 204 and the computer. When a key is pressed on the keyboard 204 this byte of data is placed into the keyboard buffer 209, from which the computer collects it to interpret.

The operating system 202, and through it other software, makes available via a window content API 211 a textual description of a window's content. Calls may be made to the window content API 211 to gain information on the content of the window. This window content API 211 is used by a screen reader and the resulting content information is synthesized to audio output.

The described test generating system 220 includes a test screen component 230 for generating a simulation of the content of a screen available via a screen reader, and a test input component 240 for generating a pointer device simulation of the keyboard access of a non-mouse user of a screen reader.

The test screen component 230 includes a content obtaining component 231 which makes calls to the window content API 211 of the operating system 202 to obtain information on the content of a window of a GUI 203 of the software 201 under test. This information is equivalent to the information that a screen reader would obtain.

The test screen component 230 also includes a determining component 232 for determining the objects in the GUI 203 which are not available from the window content API 211 (and therefore would not be provided as audio output by a screen reader).

The test screen component 230 optionally includes a visual clues component 233 which determines objects in the GUI 203 which may provide visual clues to a user which would not be available to an unsighted user receiving a screen reader audio output. For example, color may provide clues and therefore may be made grayscale, and images may provide clues and may be replaced by only showing their alternative text, in a rectangle that represents the image.

A mask generating component 234 of the test screen component 230 generates a mask layer (mask layer 1) 235 to be applied to the screen buffer 207 when a test is applied. The mask layer (mask layer 1) 235 indicates the objects in the GUI 203 which are not available in the audio output of a screen reader including the objects from the determining component 232 and from the visual clues component 233. The indication may be a blanking out of the object or a highlighting of the object, or replacing of the object, for example with grayscale.

The test input component 240 determines what can be interacted with on the GUI 203 via the keyboard 204.

The test input component 240 includes a keyboard simulation component 241. The keyboard simulation component 241 inserts bytes upon the keyboard buffer 209 such that the computer thinks that the bytes came from the keyboard 204 simulating a keyboard key having been pressed to explore what artifacts of the screen can be reached via the keyboard (for example via multiple presses of the tab key). Automated tab ring analysis can be performed on the GUI 203. Tab rings refer to the topology of visual elements or controls that are reachable by continually pressing the tab key. This is non-invasive testing as it only involves interacting with the keyboard buffer 209.

The test input component 240 also includes a tab trap component 242 for determining if there are any tab-traps where a user tabs somewhere and then cannot tab back out again to a previous tab position.

The test input component 240 also includes a keyboard shortcut component 243 for determining if there are any shortcut keys available and which parts of the GUI 203 are accessed by the shortcuts. This may involve more invasive testing of the GUI 203 such as source code analysis.

The test input component 240 includes a data file generating component 244 for generating a data file 245 of artifacts of the GUI 203 can be interacted with via the keyboard 204. Alternatively, the data file 245 may contain the artifacts of the GUI 203 which cannot be interacted with via the keyboard 204

The test input component 240 may include a visual highlighting component 246 for providing an additional mask layer (mask layer 2) 247 for GUI components which are not accessible and any tab-traps.

These artifacts of the GUI 203 which cannot be interacted with via the keyboard 204 can be made unavailable to the testing user, when the testing system is activated and the user is using a pointer device. Thus allowing the pointer device using sighted user to interact only with those artifacts that the keyboard could have accessed.

Referring to FIG. 3, a block diagram shows an embodiment of a second aspect of the accessibility testing system 300. An accessibility tester, which may be a sighted user, uses a computer system 210 as described in FIG. 2 to test the software 201 operating on the operating system 202 and having a GUI 203. The accessibility tester uses a pointer device 205.

A testing mechanism 310 is provided to simulate the content of a GUI 203 of the software 201 as it would be available to a user of a screen reader. The testing mechanism 310 also simulates inputs available to the accessibility tester by restricting the pointer device operations that can be made.

The testing mechanism 310 includes a mask applying component 311 for applying the mask layer (mask layer 1) 235 to the screen buffer 207 to restrict the GUI 203. The mask applying component 311 may also apply the additional mask layer (mask layer 2) 247 showing GUI components which are not accessible by the keyboard and any tab-traps.

The testing mechanism 310 includes a pointer device restricting component 312 for restricting the pointer device access via a pointer device management component 212 in accordance with the data file 245 of user interface artifacts which can or cannot be interacted with on the GUI 203.

The testing mechanism 310 may also include a reporting component 313 to export screenshots of violating screens, or reports including the screenshots, or to maintain a history of the screens.

When the accessibility tester enables the testing mechanism 310 it applies limitations to the tester's pointer device interactions to prevent them interacting with GUI components which would have not been available via the keyboard. The testing mechanism 310 may also include a visual indication component 314 providing indication to the tester when a pointer device interaction (click) is not allowed. Further to this it may also indicate visually any tab-traps as explained above. This creates a pointer device representation of what would be available via the keyboard.

Figure 4A:
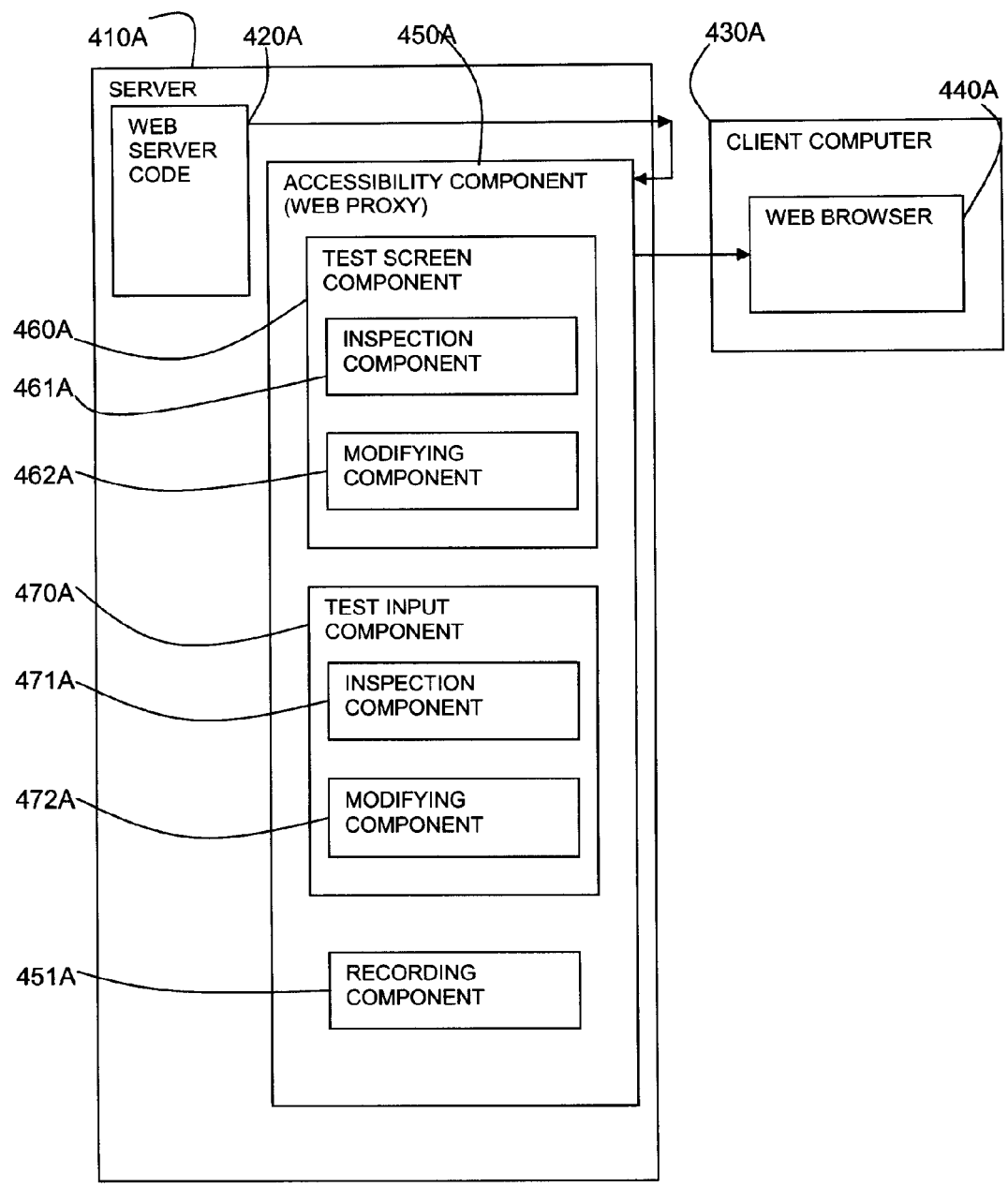
FIGS. 4A and 4B are block diagrams of two embodiments of a further aspect of a system in accordance with the present invention.
Figure 4B:
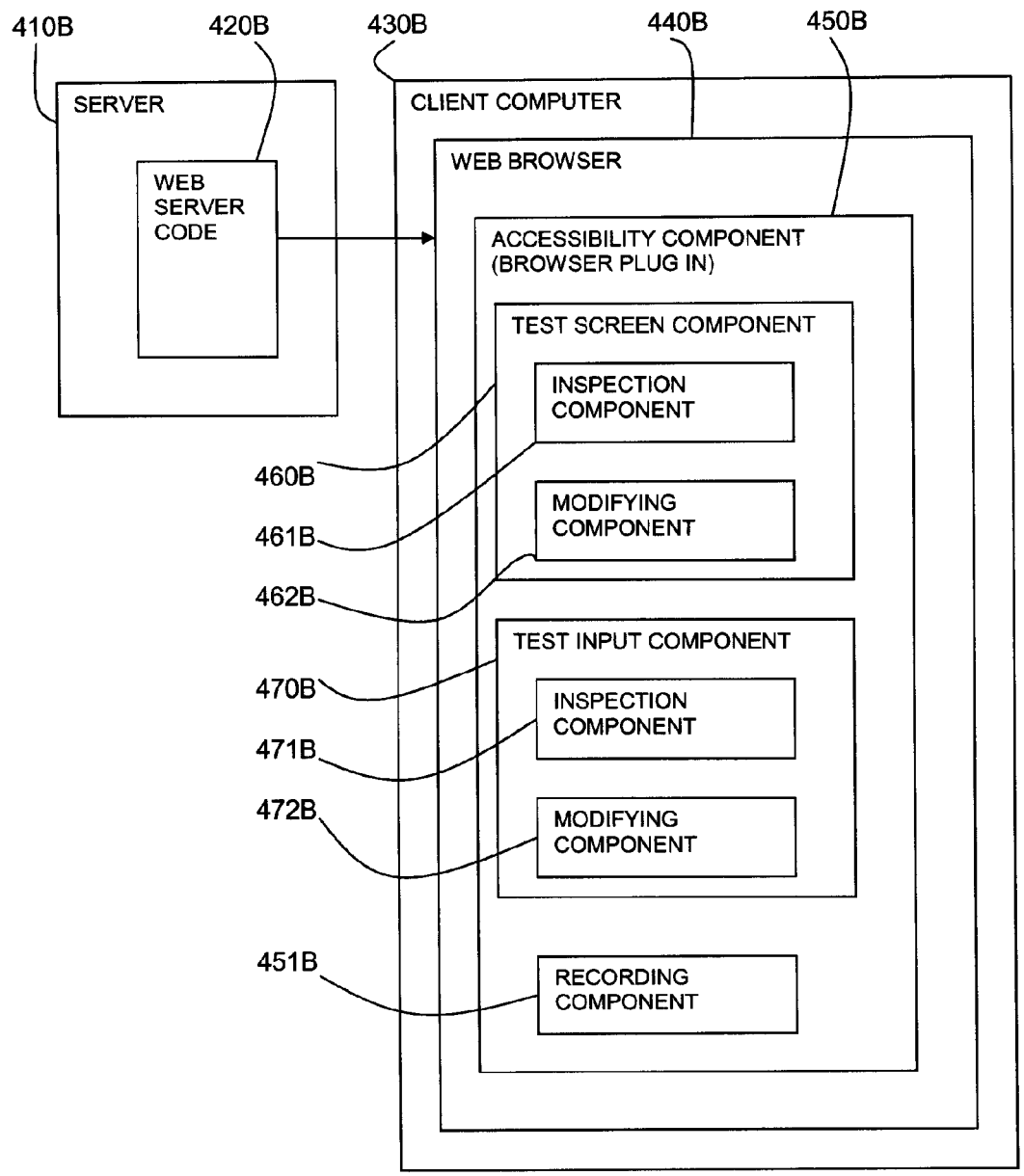

Referring to FIGS. 4A and 4B, block diagrams show two embodiments of a further aspect of the described testing system when applied as a web service.

Where a GUI is provided by a web application rendering content in a web browser, a more invasive approach may be used inspecting the presentation logic. This is possible because in the case of the web browser the presentation language (HTML—hypertext mark-up language) is sent to the browser in a form which can be processed (i.e. plain text).

This aspect places some code between the browser's presentation layer and the server software sending the HTML. In a first embodiment shown in FIG. 4A, this is performed server side as a web proxy. In a second embodiment shown in FIG. 4B, this is performed client side as a browser plug in.

In FIG. 4A, a server 410A is provided with web server code 420A and an accessibility component 450A provided as a web proxy. A client computer 430A runs a web browser 440A for accessing the content served by web server code 420A.

In FIG. 4B, a server 410B is provided with web server code 420B. A client computer 430B runs a web browser 440B for accessing the content served by web server code 420B and including the accessibility component 450B as a browser plug in.

In either case, the accessibility component 450A,B includes a test screen component 460A,B for generating a simulation of the content of a screen available via a screen reader and a test input component 470A,B for generating a pointer device simulation of the keyboard access of a non-mouse user of a screen reader.

The test screen component 460A,B includes an inspection component 461A,B for inspection of the HTML source code to ascertain the artifacts or elements of the web page that do not have accessibility information such as screen reader useable information (i.e. descriptive text). A modifying component 462A,B modifies the display properties of those elements that have no screen-reader usable information. The modification may make the elements invisible. This can be done by removal of links or via a style sheet property e.g. a format style defined as invisible.

As an HTML sample includes the source code (which a compiled binary program in the embodiment of FIG. 2 does not) it can see what accessibility information has been provided. For example here is the source for an inaccessible image:

<img src="/pics/diode.jpg">

If it was accessible it may look like this:

<img src="/pics/house.jpg" alt="a diagram showing the positive is the longer leg on a diode">.

In an alternative embodiment, the accessibility component may render the page in memory. This can be done by performing the same interpretation as the browser, changing the source code into a page a user could view. However, instead of rendering it on the screen, it could be done in memory only, where the accessible properties can then be analyzed. Once analyzed and modified, the page may be rendered by the browser and made available to an end user for testing.

Both of these implementations are only possible because the accessibility component 450A,B can be placed between the server and the end user and has access to the source.

The test input component 470A,B, again in either case, includes an inspection component 471A,B for inspection of the HTML source code to ascertain the artifacts or elements of the page that are unreachable via the keyboard. A modifying component 472A,B modifies the properties of those elements that are not reachable via the keyboard so as to make them unreachable via a pointer device. This can be done, for example, by removing links and by changing buttons into static images.

The intractability of artifacts or elements of the GUI can be achieved mid-flow between the server and the end user by source code analysis. In one embodiment, the source code may be rendered first at a location other than the end user's screen, in order to identify a non-reachable element and modify it. Subsequent presentation of the modified source code is provided to the end user's screen for testing.

The inspection and modifying of the source code can be done in one step with no need to separately record the analysis; however, the two stages of inspection and modifying could be done separately with a record kept of the artifacts/elements identified. This may be done for performance reasons, so that a subsequent request for the page can be modified without need to re-identify the elements. To this end a recording 251A,B component may be provided.

A Document Object Model (DOM) is cross-platform and language-independent convention for representing and interacting with objects. DOM is used by scripts that wish to inspect and modify a web page dynamically. The accessibility component 450A,B can traverse the DOM dynamically and change the visual nature of inaccessible elements with a style change or by removing links.

Figure 5:
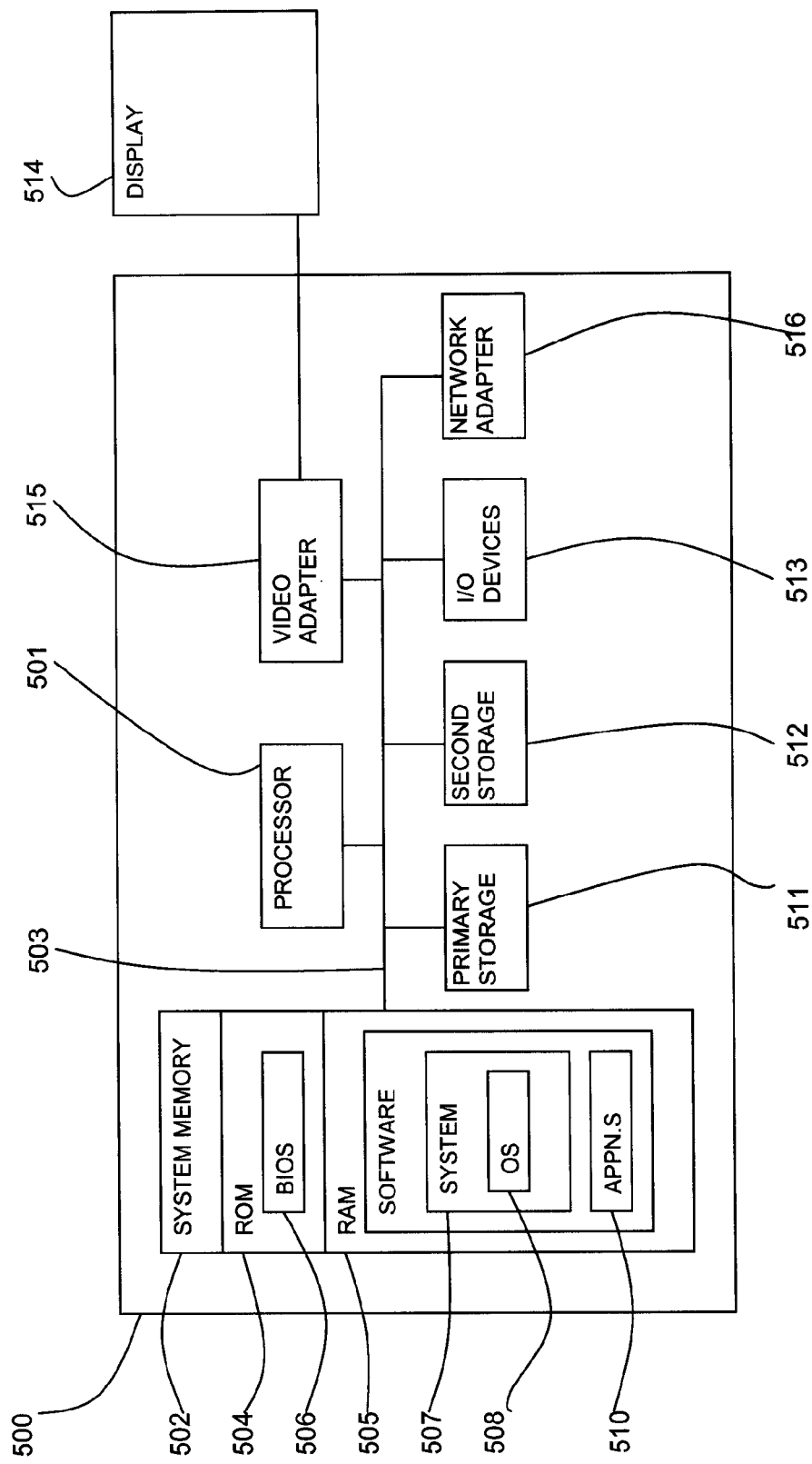
FIG. 5 is a block diagram of a computer system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Figure 6A:
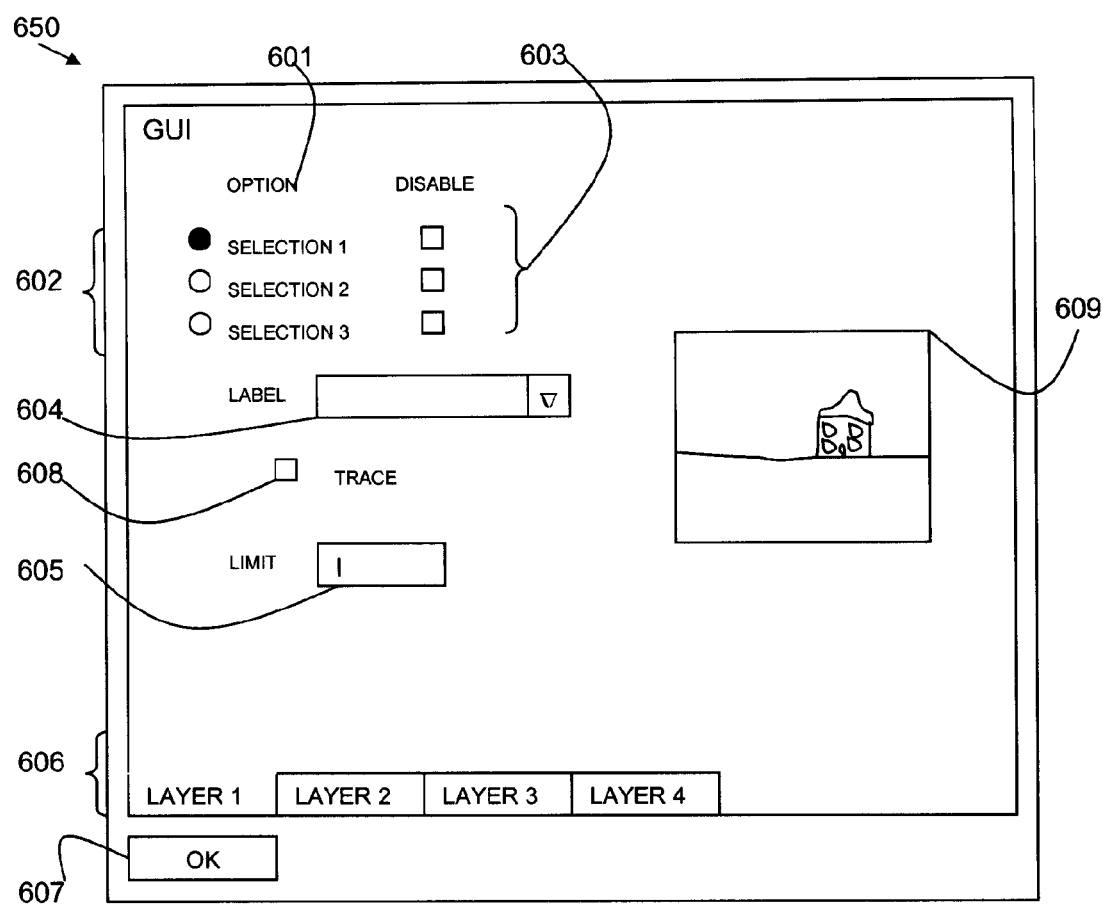
FIGS. 6A and 6B show an example graphical user interface to which the present invention is applied.

Referring to FIG. 6A, an example GUI 600 is shown as a sighted person sees it. Many different artifacts or objects may be included in a GUI and only a few are illustrated in FIG. 6A. The GUI 600 includes various components including: text 601, selection buttons 602, check box 608, disable buttons 603, drop down menus 604, a numerical input box 605, tab labels 606 to other layers, OK button 607, image 609, etc.

A screen reader may process the GUI 600 and some of the interface (for example, elements 601-609) may not be read out because they are not accessible. Also, some portions of the GUI 600 may not be reachable using the keyboard.

The sighted accessibility tester activates the described testing mechanism which may run in the background and applies changes to their screen buffer. As such they see the GUI 650 of FIG. 6B when testing.

Figure 6B:
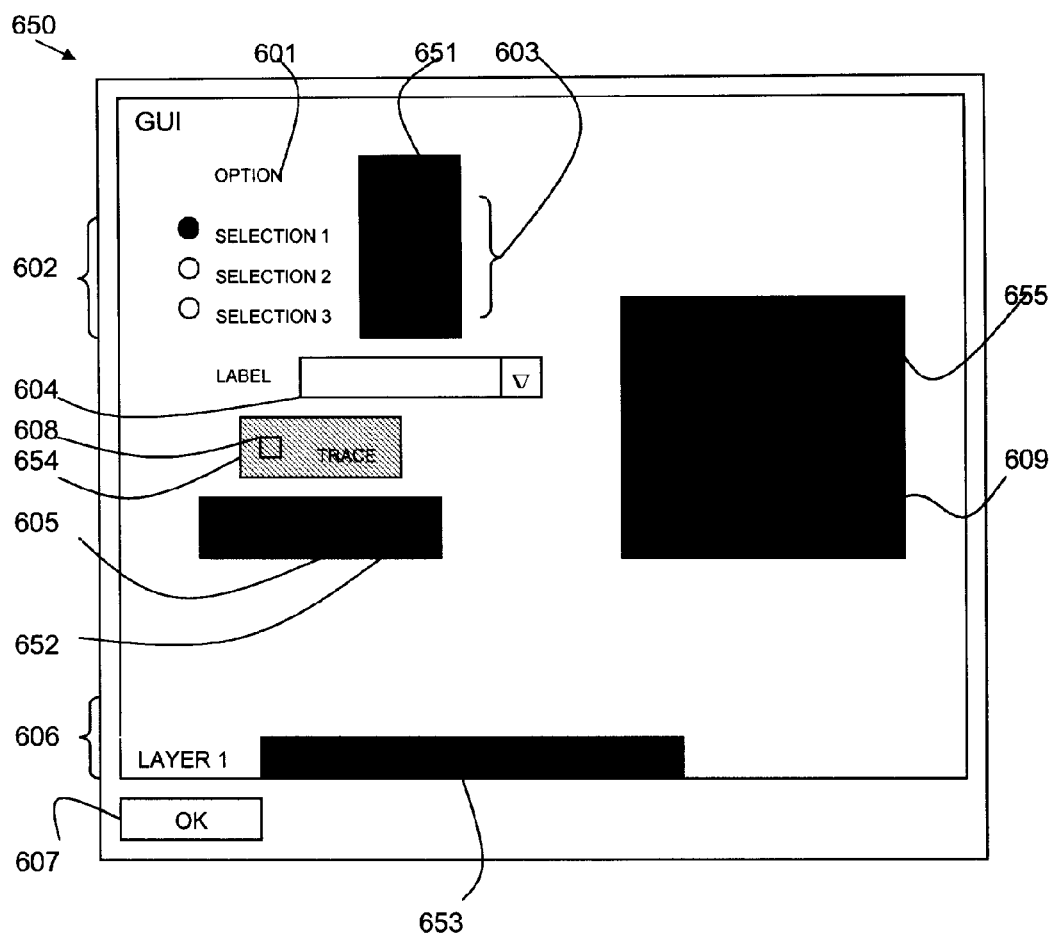

In FIG. 6B, parts of the GUI 650 that would not be read out by a screen reader are not visible to the sighted tester and are shown as masked blacked out areas 651, 652, 653, 655. In this example illustration, the disable buttons 603 are masked 651, the numerical input box 605 is masked 652, the tab labels 606 to other layers are masked 653, and the image 609 is masked 655.

In addition, the check box 608 is inaccessible with the mouse and this is visually indicated 654 (as shown in hashed) as this would not be accessible via the keyboard.

An alternative would be to have the blacked out areas slightly transparent or visible via some form of key press, to enable a user to view the underlying content. This may be used to establish what is missing.

Referring to FIG. 7, a flow diagram 700 shows an embodiment of an aspect of the described method of software accessibility testing by building a GUI testing mask.

The software to be tested is launched 701. The test system behaves 702 like a screen reader, interacting with the operating system and obtaining 703 accessibility information on all the artifacts of the GUI.

It is determined 704 the content of the GUI for which text is not included and therefore would not be included in an audio output of a screen reader. A mask layer is built 705 to mask the GUI content that is not included in the audio output. The mask layer may also obscure 706 other visual cues, such as colour (by making it grayscale) and images (by only showing their alternative text, in a rectangle that represents the image).

The mask layer is applied 707 to the screen buffer and a modified screen displayed 708 which has been modified to hide the artifacts which have no accessible content provided.

Figure 8:
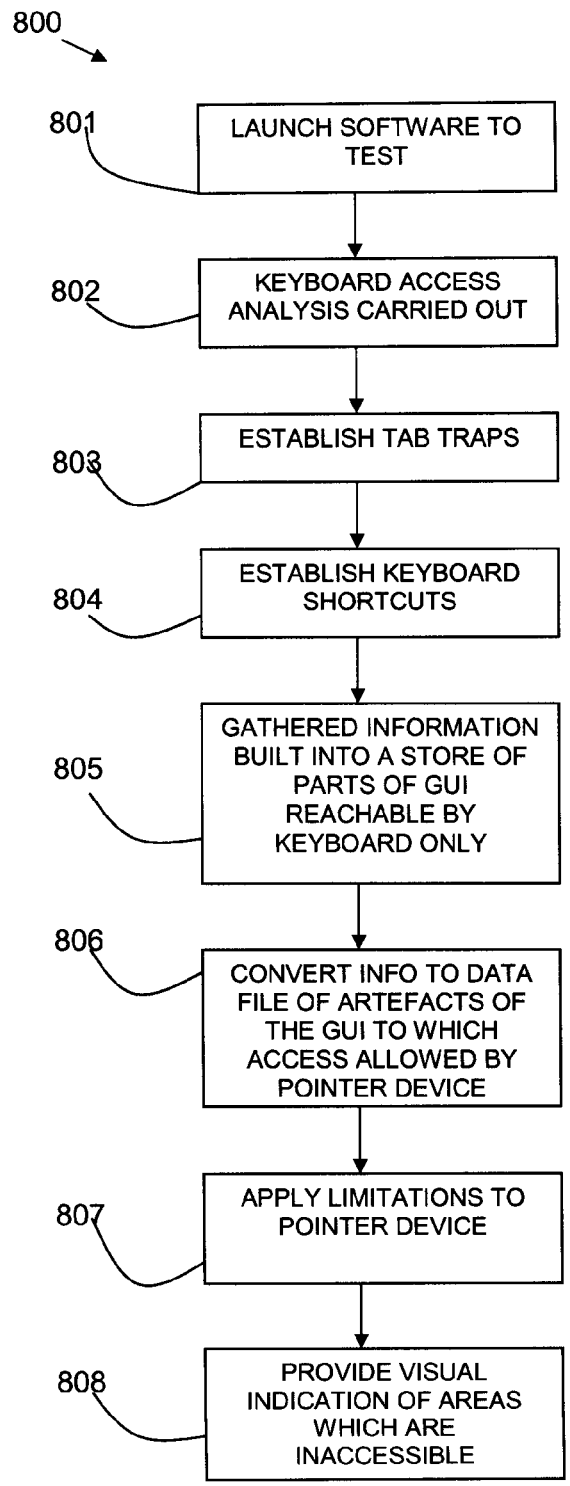
FIG. 8 is a flow diagram of an aspect of the described testing method for restricting pointer device access, in accordance with an embodiment of the invention.

Referring to FIG. 8, a flow diagram 800 shows an aspect of the described method of software accessibility testing of restricting pointer device access during testing.

The software to be tested is launched 801. Each screen and panel is navigated using standard navigation keys. This is done by injecting key presses into the keyboard buffer. Automated keyboard access analysis is carried out 802 on the GUI to establish which parts of the interface can be accessed using the keyboard. Any tab traps are also established 803. In addition, parts of the GUI reachable by keyboard shortcuts are also established 804.

The gathered information is built 805 into a store of the parts of the GUI reachable by keyboard use only. This information is converted 806 to a data file of artifacts of the GUI to which access will (or will not) be allowed by the pointer device.

The data file of artifacts of the GUI to which access is allowed/not allowed by the pointer device is used to apply 807 limitations to the tester's pointer device using the pointer device management component.

In addition, a visual indication is provided 808 on the GUI of areas which are not accessible, including any tab traps.

Referring to FIG. 9, a flow diagram 900 shows an aspect of the described method of software accessibility testing of using the test system.

A tester is provided 901 with a GUI of software to be tested simulated as provided by a screen reader. The generated mask layer (or layers) is applied 902 to the screen buffer of the GUI to reflect the output of the screen reader. This restricts the GUI to only components that would have been audibly provided.

The method reads 903 in the data file of artifacts of the GUI to which access is allowed by the pointer device and a pointer device management component is restricted to access to the GUI corresponding to keyboard access.

The software to be tested is launched 904. The tester navigates 905 around the GUI using his pointer device, by positioning the pointer over screen artifacts and clicking. The method prevents 906 clicks from being actioned upon artifacts it has determined are unreachable. This could be done, for example, by intercepting mouse instructions as they are passed to the operating system. Optionally, some visual indicator is displayed 907 to the tester to let them know their click was prevented for accessibility reasons (for example, the cursor flashes in a distinctive way).

The tester evaluates 908 the GUI and access and flags up any difficulties. A report may be generated 909 including export of a relevant GUI screen shot.

Referring to FIG. 10, a flow diagram 1000 shows an aspect of the described method of software accessibility testing using a web service.

A web server code serves 1001 a page to a user. The method intercepts 1002 the page source (either client or server side as described in relation to FIGS. 4A and 4B). The method inspects 1003 the source and ascertains which displayed artifacts can be reached via the keyboard and locates any artifacts which to not provide accessibility text (such as images with no alternative text). The method modifies 1004 the source to alter the visual display properties of unreachable or unreadable artifacts (to blank them out for example). This can be done using a style sheet property or by removing links. The modified source is presented 1005 by the web browser to an accessibility tester.

The described method helps both formal testing ensuring that a piece of software complies with accessibility checklists and also informal testing by allowing developers to quickly see if a GUI they are developing has accessibility problems.

The accessibility test software visually highlights unreachable or not accessible GUI widgets in either an interactive session or output information about the unreachable components as some kind of report.

The described testing system behaves like a screen reader, gaining access to the same information and APIs as a screen reader. The testing system performs its own comparison between artifacts on a screen and artifacts verbalized, and is not trained with expected output. The testing system represents the output to a tester by modifying the existing screen to be a screen representation matching what a blind user would hear. This is a powerful demonstration of the value of adding accessibility. In addition, the testing system modifies/limits navigation normally achievable via a pointer device to be representative of what a blind user can reach via the keyboard.

The testing system enables aspects of the GUI that are not compliant with accessibility to be determined. Testers do not need to be skilled in accessibility testing, for example, they do not need to be expert users of screen reader software. The impact of accessibility violations is demonstrated visually and developers can see at a glance which aspects of the GUI need to be addressed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for software accessibility testing, comprising:
   obtaining accessibility information on content of a graphical user interface (GUI) of software under test, wherein accessibility information is content of the GUI for which describing text is available or content of the GUI which is accessible by keyboard use;
   determining content of the GUI which should not be available in a test due to a lack of accessibility information;
   restricting the GUI to restrict access to the content not available by applying a mask layer to a screen buffer of content of the GUI; and
   providing the restricted GUI to a user for testing.

2. The method as in claim 1, including:
   determining the access to content of a GUI by keyboard use; and
   restricting a pointer device access to the GUI to reflect the keyboard access.

3. The method as in claim 2, wherein a test generating system behaves like a screen reader to obtain accessibility information on content of a graphical user interface (GUI) of software under test by calling an operating system application programming interface (API) making available a textual description of the content of the GUI.

4. The method as in claim 2, wherein determining the access to content of a GUI by keyboard use includes:
   simulating keyboard inputs and at least one of carrying out tab ring analysis determining any tab traps.

5. The method as in claim 1, wherein determining content of the GUI which should not be available in a test is carried out for a web page and includes:

intercepting a web page source;
inspecting source code of a web page to identify one or more elements without accessibility information in form of screen reader textual description; and
modifying the source code to remove or alter the visual display of the inaccessible elements.

6. A computer software product for software accessibility testing, the product comprising a computer-readable storage medium having computer readable program code embodied therewith, the computer readable program code configured to:
obtain accessibility information on content of a graphical user interface (GUI) of software under test, wherein accessibility information is content of the GUI for which describing text is available or content of the GUI which is accessible by keyboard use;
determine content of the GUI which should not be available in a test due to a lack of accessibility information;
restrict the GUI to restrict access to the content not available by applying a mask layer to a screen buffer of content of the GUI; and
provide the restricted GUI to a user for testing.

7. The computer software product as in claim 6, further including computer readable program code to:
determine the access to content of a GUI by keyboard use; and
restrict a pointer device access to the GUI to reflect the keyboard access.

8. The computer software product as in claim 7, wherein a test generating system behaves like a screen reader to obtain accessibility information on content of a graphical user interface (GUI) of software under test by calling an operating system application programming interface (API) making available a textual description of the content of the GUI.

9. The computer software product as in claim 7, wherein the computer readable program code determines the access to content of a GUI by keyboard use by simulating keyboard inputs and at least one of carrying out tab ring analysis determining any tab traps.

10. The computer software product as in claim 6, wherein the computer readable program code determines content of the GUI which should not be available in a test is carried out for a web page and is configured to:
intercept a web page source;
inspect source code of a web page to identify one or more elements without accessibility information in form of screen reader textual description; and
modify the source code to remove or alter the visual display of the inaccessible elements.

11. A system for software accessibility testing, comprising:
a test screen component including:
a content obtaining component for obtaining accessibility information on content of a graphical user interface (GUI) of software under test, wherein accessibility information is content of the GUI for which describing text is available or content of the GUI which is accessible by keyboard use;
a determining component for determining content of GUI which should not be available in a test due to a lack of accessibility information;
a restricting component for restricting the GUI to restrict access to the content not available by applying a mask layer to a screen buffer of content of the GUI.

12. The system as in claim 11, including:
a test input component for determining the access to content of a GUI by keyboard use;
a pointer device management component for restricting a pointer device access to the GUI to reflect the keyboard access.

13. The system as in claim 11, wherein the content obtaining component is operable to behave like a screen reader and call an operating system application programming interface (API) making available a textual description of content of the GUI.

14. The system as in claim 11, wherein the test input component includes:
a keyboard simulation component for simulating keyboard inputs and carrying out tab ring analysis and determining any tab-traps;
a keyboard shortcut component for determining keyboard shortcuts.

15. The system as in claim 14, including a data file generating component for generating a data file of artifacts of the GUI to which a pointer device is allowed or not allowed access.

16. The system as in claim 11, including providing a web based accessibility component including:
an inspection component for intercepting a web page source and inspecting the source and ascertaining accessibility information; and
a modifying component for modifying the source to remove or alter the visual display of inaccessible elements.

17. The system as in claim 11, including:
a testing mechanism including:
a mask applying component for restricting access to content of the GUI; and
a pointer device restricting component for restricting a pointer device access to the GUI to reflect the keyboard access.

18. The system as in claim 17, including a visual indication component for providing a visual indication of artifacts of the GUI to which pointer device access is not allowed.

* * * * *